United States Patent
Yasutomi

(10) Patent No.: US 8,908,234 B2
(45) Date of Patent: Dec. 9, 2014

(54) IMAGE CAPTURE APPARATUS, IMAGE CAPTURE SYSTEM, AND IMAGE CAPTURE METHOD

(71) Applicant: Kei Yasutomi, Tokyo (JP)

(72) Inventor: Kei Yasutomi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/860,659

(22) Filed: Apr. 11, 2013

(65) Prior Publication Data

US 2013/0286445 A1    Oct. 31, 2013

(30) Foreign Application Priority Data

Apr. 27, 2012  (JP) ................... 2012-103986

(51) Int. Cl.
*H04N 1/40* (2006.01)
*H04N 1/00* (2006.01)
*H04N 1/409* (2006.01)

(52) U.S. Cl.
CPC ............ *H04N 1/40093* (2013.01); *H04N 1/00* (2013.01); *H04N 1/4092* (2013.01)
USPC ........... 358/448; 358/1.9; 358/3.27; 358/474; 382/168; 382/254; 382/260; 382/264

(58) Field of Classification Search
None
See application file for complete search history.

(56) References Cited

U.S. PATENT DOCUMENTS

| | | | | |
|---|---|---|---|---|
| 4,317,179 | A  * | 2/1982 | Kato et al. ................... | 382/264 |
| 4,394,737 | A  * | 7/1983 | Komaki et al. ................. | 378/23 |
| 6,724,941 | B1 * | 4/2004 | Aoyama ....................... | 382/254 |
| 6,934,409 | B2 * | 8/2005 | Ohara .......................... | 382/132 |
| 7,130,460 | B2 * | 10/2006 | Nakazawa et al. ............ | 382/128 |
| 7,301,670 | B2 * | 11/2007 | Yamano et al. ................ | 358/1.9 |
| 2004/0042679 | A1 * | 3/2004 | Yamada ........................ | 382/260 |
| 2005/0088697 | A1 | 4/2005 | Yasutomi et al. | |
| 2006/0279589 | A1 | 12/2006 | Yasutomi et al. | |
| 2007/0263929 | A1 * | 11/2007 | Kaji ............................. | 382/168 |
| 2009/0080036 | A1 * | 3/2009 | Paterson et al. .............. | 358/474 |
| 2011/0222125 | A1 | 9/2011 | Yasutomi et al. | |
| 2014/0044373 | A1 * | 2/2014 | Yasutomi .................... | 382/254 |

FOREIGN PATENT DOCUMENTS

| | | |
|---|---|---|
| JP | 04-273046 | 9/1992 |
| JP | 08-086634 | 4/1996 |
| JP | 2003-042737 | 2/2003 |
| JP | 2004-171231 | 6/2004 |
| JP | 4348315 | 7/2009 |
| JP | 4385925 | 10/2009 |
| JP | 2010-026937 | 2/2010 |

* cited by examiner

*Primary Examiner* — Dung Tran
(74) *Attorney, Agent, or Firm* — Oblon, Spivak, McClelland, Maier & Neustadt, L.L.P.

(57) ABSTRACT

An image capture apparatus includes: a light irradiation unit that irradiates an object with light; a reading unit that reads an image in accordance with reflected light of the light irradiated to the object; and an enhancement unit that enhances a predetermined spatial-frequency component of the image.

8 Claims, 6 Drawing Sheets

FIG.5

| No. | SPATIAL-FREQUENCY RANGE ON WHICH ENHANCEMENT PROCESSING IS PERFORMED [cyc/mm] | VISUAL EVALUATION RESULT (IMPROVEMENT OF TEXTURE AND RELIEF APPEARANCE) |
|---|---|---|
| 1 | $0.0 \leq k < 1.0$ | POOR<br>COLOR OF IMAGE WAS CHANGED BECAUSE SPATIAL FREQUENCY OF 0.0 WAS INCLUDED |
| 2 | $0.0 < k < 1.0$ | GOOD<br>TEXTURE AND RELIEF APPEARANCE (THREE-DIMENSIONAL APPEARANCE) WERE IMPROVED |
| 3 | $1.0 < k < 2.0$ | POOR<br>TEXTURE AND THREE-DIMENSIONAL APPEARANCE WERE NOT IMPROVED AND MEDIUM-FINE-LEVEL SHADING WAS ENHANCED |
| 4 | $2.0 < k < 3.0$ | POOR<br>TEXTURE AND THREE-DIMENSIONAL APPEARANCE WERE NOT IMPROVED AND FINE-LEVEL SHADING WAS ENHANCED |
| 5 | $0.0 < k < 2.0$ | MEDIUM<br>TEXTURE AND RELIEF APPEARANCE (THREE-DIMENSIONAL APPEARANCE) WERE IMPROVED, BUT ENHANCEMENT OF MEDIUM-FINE-LEVEL SHADING WAS NOTICEABLE (INFERIOR TO NO. 2) |
| 6 | $0.0 < k < 0.5$ | GOOD<br>TEXTURE AND RELIEF APPEARANCE (THREE-DIMENSIONAL APPEARANCE) WERE IMPROVED |
| 7 | $0.5 < k < 1.0$ | GOOD<br>TEXTURE AND RELIEF APPEARANCE (THREE-DIMENSIONAL APPEARANCE) WERE IMPROVED |

FIG.6

| αk | CRITERION 1 (IMPROVEMENT OF TEXTURE AND RELIEF APPEARANCE) | CRITERION 2 (PRESENCE OR ABSENCE OF SENSE OF INCONGRUITY) |
|---|---|---|
| 0.5 | POOR | ABSENT |
| 0.6 | POOR | ABSENT |
| 0.7 | POOR | ABSENT |
| 0.8 | POOR | ABSENT |
| 0.9 | POOR | ABSENT |
| 1.0 | - (REFERENCE) | ABSENT |
| 1.1 | GOOD | ABSENT |
| 1.2 | GOOD | ABSENT |
| 1.3 | GOOD | ABSENT |
| 1.4 | GOOD | ABSENT |
| 1.5 | GOOD | ABSENT |
| 1.6 | GOOD | ABSENT |
| 1.7 | GOOD | ABSENT |
| 1.8 | GOOD | ABSENT |
| 1.9 | GOOD | ABSENT |
| 2.0 | GOOD | PRESENT |
| 2.1 | GOOD | PRESENT |
| 2.2 | GOOD | PRESENT |
| 2.3 | GOOD | PRESENT |
| 2.4 | GOOD | PRESENT |
| 2.5 | GOOD | PRESENT |

IMAGE CAPTURE APPARATUS, IMAGE CAPTURE SYSTEM, AND IMAGE CAPTURE METHOD

CROSS-REFERENCE TO RELATED APPLICATIONS

The present application claims priority to and incorporates by reference the entire contents of Japanese Patent Application No. 2012-103986 filed in Japan on Apr. 27, 2012.

BACKGROUND OF THE INVENTION

1. Field of the Invention

The present invention relates to an image capture apparatus, an image capture system, and an image capture method.

2. Description of the Related Art

A method has been known in which a document placed on an exposure glass is irradiated with scanning light emitted from a light source disposed inside a scanning head moving under the exposure glass and reflected light from a surface of the document is read by a line charge-coupled device (CCD) and thereafter, digital image data is output.

For example, Japanese Patent No. 4348315 discloses a multi-angle scanner configured to enable adjustment of an angle of an optical axis of a reading optical system with respect to a surface of an object to be scanned to a desired angle.

Japanese Patent No. 4385925 discloses an image forming method in which an image of a translucent object is acquired and a point spread function (PSF) of the object is acquired by measuring optical property of the object, and the image in which ridges and valleys on a surface are controlled, is formed by performing a deconvolution operation or a convolution operation on the image on the basis of the acquired PSF.

Japanese Patent Application Laid-open No. 2010-26937 discloses an image capture apparatus that includes a plurality of wavelength limiting units that limit a wavelength of an optical flux emitted from a light source and captures the images of an image capture target in a plurality of wavelength bands by scanning the image capture target as many as times corresponding to the number of wavelength limiting units.

A problem, however, arises in that image data is not obtained that completely reproduces a texture and a relief appearance of an image capture target having the relief (ridges and valleys).

In view of the above, there is a need to provide an image capture apparatus, an image capture system, and an image capture method that can acquire image data completely reproducing a texture and a relief appearance of an image capture target having the relief.

SUMMARY OF THE INVENTION

It is an object of the present invention to at least partially solve the problems in the conventional technology.

An image capture apparatus includes: a light irradiation unit that irradiates an object with light; a reading unit that reads an image in accordance with reflected light of the light irradiated to the object; and an enhancement unit that enhances a predetermined spatial-frequency component of the image.

An image capture system includes: an image acquisition unit that acquires an image read in accordance with reflected light of light irradiated to an object, from the object; and an enhancement unit that enhances a predetermined spatial-frequency component of the image.

An image capture method includes: irradiating an object with light; reading an image in accordance with reflected light of the irradiated light from the object; and enhancing a predetermined spatial-frequency component of the image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a table illustrating the relationship between spatial-frequency ranges to which enhancement processing is applied and respective visual evaluation results;

FIG. 6 is a table illustrating the visual evaluation results when an enhancement coefficient $\alpha_k$ was changed;

DETAILED DESCRIPTION OF THE PREFERRED EMBODIMENTS

Figure 1:
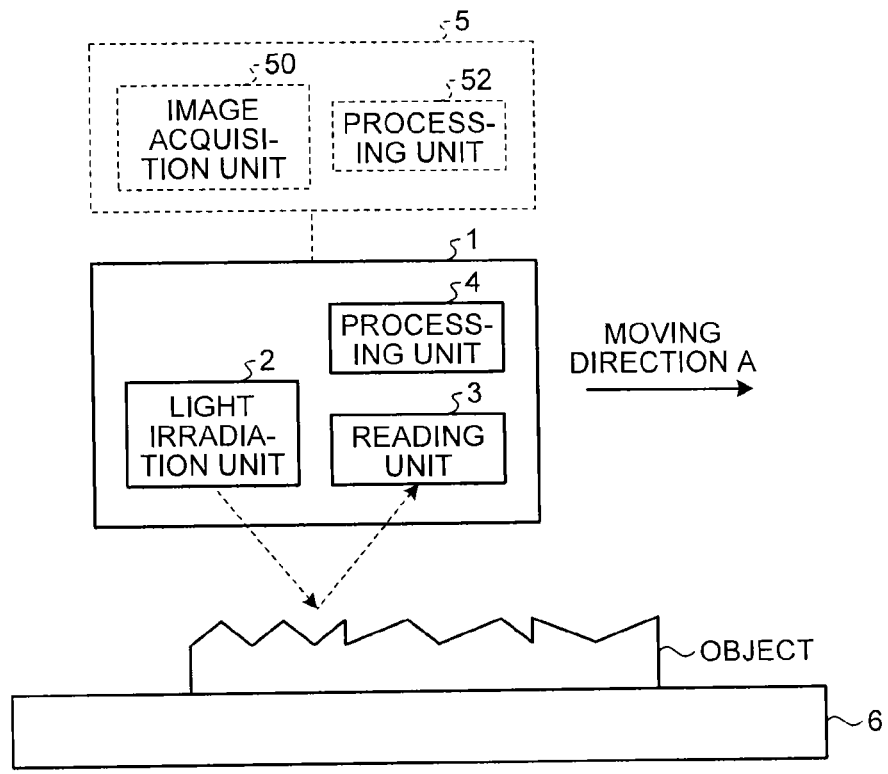
FIG. 1 is a structural diagram illustrating a configuration of an image capture apparatus according to an embodiment of the invention and an overview of the surrounding of the image capture apparatus.

An embodiment of an image capture apparatus is described in detail below with reference to the accompanying drawings. FIG. 1 is a structural diagram illustrating a configuration of an image capture apparatus 1 according to an embodiment of the invention and an overview of the surrounding of the image capture apparatus 1. The image capture apparatus 1 includes a light irradiation unit 2, a reading unit 3, and a processing unit 4. The light irradiation unit 2, the reading unit 3, and the processing unit 4 may be integrated with each other. The image capture apparatus 1 functions as a scanner that obtains image data by scanning an object placed on a supporting table 6 while moving in a moving direction A illustrated in FIG. 1, for example. A configuration may be employed in which the supporting table 6 moves instead of the movement of the image capture apparatus 1. For example, a personal computer (PC) 5 may be connected to the image capture apparatus 1, and the image capture apparatus 1 may be configured to operate to output the image data to the PC 5 under the control of the PC 5.

The light irradiation unit 2 includes a light source (not illustrated) that extends in a direction perpendicular to the moving direction A. The light irradiation unit 2 irradiates the object placed on the supporting table 6 with light so as to produce shadow caused by the surface relief (ridges and valleys on the surface) of the object while moving in the moving direction A. The supporting table 6 moves in the vertical direction. That is, the light irradiation unit 2 can irradiate the object with light at an irradiation angle set with respect to the surface of the object by moving the supporting table 6 in the vertical direction in accordance with the thickness of the object.

The reading unit 3 includes a line sensor that extends in the direction perpendicular to the moving direction A. The reading unit 3 includes a solid imaging element such as a charge-coupled device (CCD) and a lens, and has an image capture function. The CCD and the lens are not illustrated in FIG. 1. The reading unit 3 reads an image in accordance with reflected light from the object on which shadow is produced due to the surface relief of the object while moving in the moving direction A. That is, the reading unit 3 receives reflected light from the object and converts the reflected light into the electrical signal representing the image.

The surface relief of the object is reflected in the captured image through shadow. To completely reproduce the texture and the relief appearance, an irradiation condition of light to produce shadow is indispensable. When no shadow is produced, the captured image in which the surface relief of the object is reflected cannot be obtained.

It is ideal for the reading unit 3 that reflected light from an attention area of the object completely corresponds to data value of the attention area (attention pixel) of the captured image data. However, this corresponding relation is probably not always completely satisfied practically (an imaging performance of a reading optical system at such a level that no failures in the shape and colors of the object occur in the captured image is assured). Practically, part of reflected light from an area other than the attention area of the object may influence the data values of the attention pixel of the captured image. That is, in a light receiving unit such as the CCD in the reading optical system, reflected light from another area (unwanted light) than the attention area may get mixed.

A phenomenon called a flare in an optical system resembles this phenomenon. The flare is a phenomenon that is perceived as a defect on an image. The previously mentioned phenomenon taking place in the captured image read by the reading unit 3 has an intensity of such a very small level that it is not obviously perceived, and influences the considerably distant pixels. In this point, the previously mentioned phenomenon differs from the flare. Even though the previously mentioned phenomenon is not obviously perceived, the previously mentioned phenomenon may influence the texture and the surface relief appearance of the object and cause the deterioration of the texture and the surface relief appearance in the captured image.

The processing unit 4 performs processing to enhance a predetermined spatial-frequency component of the image represented by the electrical signal resulting from the conversion of the reading unit 3, and outputs the processing result (captured image data) to the PC 5, for example. It is believed that the processing to enhance a predetermined spatial-frequency component performed on the captured image data corresponds to conversion (corresponding to, so to speak, inverse conversion) that corrects the above-described phenomenon in which part of reflected light from the area other than the attention area of the object influences the value of the attention pixel. It is believed that the enhancement processing performed on the specific spatial-frequency component has an effect similar to that of the reduction of the phenomenon in which part of reflected light from the area other than the attention area of the object gets mixed, and as a result, the captured image can be obtained in which the texture and the relief appearance of the object are improved.

The PC 5 includes an image acquisition unit 50 and a processing unit 52. The image acquisition unit 50 acquires the image, for example, represented by the electrical signal resulting from the conversion of the reading unit 3, for example, through a network (not illustrated) and outputs the acquired image to the processing unit 52. The processing unit 52 has a configuration similar to that of the processing unit 4, for example, and performs the processing to enhance predetermined a spatial-frequency component on the image represented by the electrical signal resulting from the conversion of the reading unit 3. That is, either the processing unit 4 or the processing unit 52 may perform the processing to enhance a predetermined spatial-frequency component on the image represented by the electrical signal resulting from the conversion of the reading unit 3.

Figure 2:
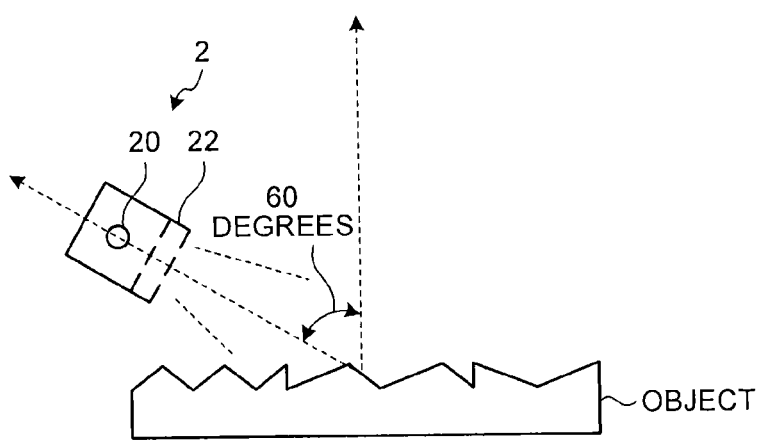
FIG. 2 is a sectional view illustrating a cross-section of a light irradiation unit in the short direction thereof.

Each unit included in the image capture apparatus 1 is described in detail below. FIG. 2 is a sectional view illustrating a cross-section of the light irradiation unit 2 in the short direction thereof. As illustrated in FIG. 2, the light irradiation unit 2 includes a light source 20 and a diffuser plate 22. The light source 20 is a fluorescent light or a light-emitting diode (LED) having high color rendering property, for example. The diffuser plate 22 is provided to prevent uneven lighting of the object. The diffuser plate 22, however, may not be provided.

The light irradiation unit 2 is disposed such that it is tilted with respect to the direction perpendicular to the object (e.g., the vertical direction) at an angle (irradiation angle) of 60 degrees, for example. When the irradiation angle is set large (when the light irradiation unit 2 is disposed at a low position), shadow corresponding to the relief of the object tends to be produced on the surface of the object. As a result, an image can be read from which the texture and the relief appearance of the object are readily perceived.

The lighting condition (irradiation condition) for the object may differ from that illustrated in FIG. 2 as long as it produces shadow in accordance with the relief of the object and allows the texture and the relief appearance (a three-dimensional appearance) of the object to be read. For example, the object is not irradiated with light from only one direction but may be irradiated with light from a plurality of directions. When the object is irradiated with light from a plurality of directions, the shadow corresponding to the relief of the object tends to disappear. In this case, it is therefore necessary to differentiate light intensity among a plurality of irradiation light components such that the shadow corresponding to the relief of the object does not disappear.

Figure 3:
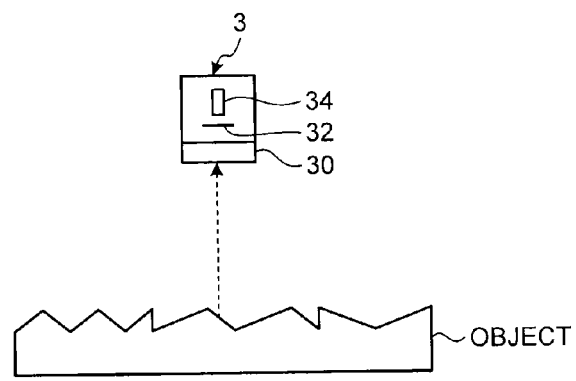
FIG. 3 is a sectional view illustrating a cross-section of a reading unit in the short direction thereof.

FIG. 3 is a sectional view illustrating a cross-section of the reading unit 3 in the short direction thereof. As illustrated in FIG. 3, the reading unit 3 includes a condensing lens 30, a color filter 32, and a line CCD (line sensor) 34, for example. The condensing lens 30 focuses reflected light of the light irradiated from the light irradiation unit 2 and reflected by the object. The color filter 32 selects the wavelength of the light reflected by the object. The line CCD 34 converts the light components, wavelengths of which are selected, into electrical signals. That is, in the reading unit 3, the color filter 32 selects wavelengths corresponding to color components of red (R), green (G), and blue (B) of light focused by the condensing lens 30, and the line CCD 34 produces the electrical signals corresponding to the reflected light amounts of the respective color components.

The wavelengths of the color components of R, G, and B are 400 to 500 nm, 500 to 580 nm, and 575 to 700 nm, respectively. In the reading unit 3, the resolution in the surface direction is 1800 dpi, for example, and the respective colors of R, G, and B are converted into the electrical signals corresponding to the respective reflected light amounts with a resolution of 16 bits, and the electrical signals are output. The reading unit 3 is disposed so as to receive light reflected from the object in the direction perpendicular to the object (e.g., in the vertical direction). The reading unit 3 may be disposed so as to receive light reflected from the object at another angle as long as it can receive reflected light from the object on which shadow is produced by the surface relief of the object and convert the reflected light into an electrical signal.

Figure 4:
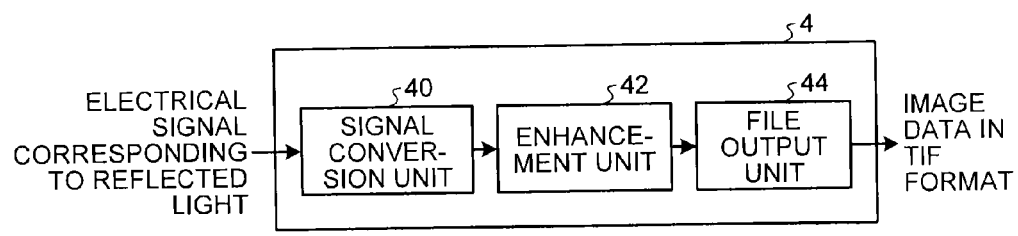
FIG. 4 is a functional block diagram illustrating a function of a processing unit.

FIG. 4 is a functional block diagram illustrating the function of the processing unit 4. As illustrated in FIG. 4, the processing unit 4 includes a signal conversion unit 40, an enhancement unit 42, and a file output unit 44, which are arranged in this order from the upstream side and operate in this order. In the processing unit 4, the signal conversion unit 40 converts the electrical signal received from the reading unit 3 into image data, the enhancement unit 42 performs processing to enhance a specific spatial-frequency component of the image data, and the file output unit 44 converts the processed image data into the image data of a general-purpose format and outputs the file thereof.

The processing unit 4 is described in detail below. The signal conversion unit 40 receives the electrical signal corresponding to the reflected light, from the reading unit 3, and converts the electrical signal into the image data having data values of 16 bits per pixel for each of the colors of R, G, and B. The resolution of the produced image data is the same as that of the reading unit 3. For example, the resolution is 1800 dpi.

The enhancement unit 42 performs discrete Fourier transform (DFT) on the image data (two-dimensional data) for each of the colors of R, G, and B and calculates two-dimensional spatial-frequency components (spatial-frequency spectra). The processing is performed on the image data in the same manner between the colors of R, G, and B. Thus, the processing performed on one color is described here.

A two-dimensional spatial-frequency spectrum F (u,v) is calculated by the following expression (1) where two-dimensional image data is f (x,y).

$$F(u, v) = \sum_{x=0}^{M-1} \sum_{y=0}^{N-1} f(x, y) e^{-2\pi i \left(\frac{ux}{M} + \frac{vy}{N}\right)} \quad (1)$$

$$u = 0, \ldots, M - 1; v = 0, \ldots N - 1$$

In this expression, M is the number of pixels in x direction and N is the number of pixels in y direction of the image data, u is an x component of the frequency and v is a y component of the frequency.

Then, a spatial frequency k, which is expressed in one-dimensional form, is calculated by the following expression (2). In expression (2), the unit of the resolution R is dpi, and the value "25.4" is based on the assumption that 1 inch is 25.4 mm.

$$k = \sqrt{k_x^2 + k_y^2} \quad (2)$$

where $$k_x = \frac{u}{M} \times \frac{R}{25.4} \quad \text{(for } u \leq M/2\text{)}$$

$$= \frac{(M-u)}{M} \times \frac{R}{25.4} \quad \text{(for } u > M/2\text{)}$$

-continued $$k_y = \frac{v}{N} \times \frac{R}{25.4} \quad \text{(for } v \leq N/2\text{)}$$

$$= \frac{(N-v)}{N} \times \frac{R}{25.4} \quad \text{(for } u > M/2\text{)}$$

The unit of the spatial frequency k calculated by expression (2) is cycle/mm. The enhancement unit 42 performs the processing to enhance the spatial-frequency spectrum in a spatial-frequency domain corresponding to the spatial frequency k of 0.0 to 1.0 (cycle/mm), which is calculated by expression (2) and expressed in one-dimensional form, where $k_x$ is the spatial frequency in the x direction and $k_y$ is the spatial frequency in the y direction. For example, the enhancement unit 42 calculates a spatial-frequency component F' (u,v) after the enhancement using the following expression (3).

$$F'(u, v) = 1.2 \times F(u, v) \quad \text{(for } k > 0.0 \text{ and } k < 1.0\text{)} \quad (3)$$

$$= F(u, v) \quad \text{(for } k = 0.0 \text{ or } k \geq 1.0\text{)}$$

That is, the enhancement unit 42 performs the enhancement processing in such a manner that the spatial-frequency spectrum is multiplied by 1.2 in the spatial-frequency domain corresponding to the spatial frequency k of 0.0 to 1.0 (cycle/mm) while the spatial-frequency spectrum remains unchanged in other spatial-frequency domains. Hereinafter, a value by which the enhancement unit 42 multiplies the spatial-frequency spectrum so as to enhance the spatial-frequency spectrum is denoted as an enhancement coefficient $\alpha_k$. For example, the enhancement unit 42 sets a value of the enhancement coefficient $\alpha_k$ to 1.2 in the spatial-frequency domain corresponding to the spatial frequency k of 0.0 to 1.0 (cycle/mm) as expressed in the following expression (4).

$$\alpha_k = 1.2 \quad \text{(for } k > 0.0 \text{ and } k < 1.0\text{)} \quad (4)$$

$$= 1.0 \quad \text{(for } k = 0.0 \text{ or } k \geq 1.0\text{)}$$

The enhancement unit 42 performs inverse DFT expressed by the following expression (5) on F' (u,v) so as to calculate image data f' (x,y) after the enhancement.

$$f'(x, y) = \frac{1}{MN} \sum_{u=0}^{M-1} \sum_{v=0}^{N-1} F'(u, v) e^{2\pi i \left(\frac{ux}{M} + \frac{vy}{N}\right)} \quad (5)$$

$$x = 0, \ldots, M - 1; y = 0, \ldots N - 1$$

The file output unit 44 converts the image data on which the enhancement unit 42 has performed the enhancement processing, into data of a general-purpose format such as tagged image file format (TIFF) and outputs the file thereof to the outside.

Although the case is described in the embodiment where the image capture apparatus 1 performs the enhancement processing using the RGB image data, it is not limited to this. For example, the enhancement processing can be performed using CMYK image data, XYZ image data, and Lab image data. The resolution R and the resolution per pixel are also not limited to the values in the embodiment. The enhancement unit 42 performs the enhancement processing using DFT. The enhancement processing, however, is not limited to being performed using DFT. For example, the enhancement unit 42 may perform the enhancement processing by convoluting the image data with a filter to perform enhancement operation in a specific spatial-frequency domain.

First Experiment Example

The inventor carried out the experiment in which the image capture apparatus 1 was operated by changing the spatial-frequency range on which the enhancement unit 42 performs the enhancement processing. Specifically, in the experiment, the captured image data was obtained by changing the spatial-frequency range where expression (3) is applied.

As for the objects used to capture the image by the image capture apparatus 1, 15 types of objects were selected as the objects having respective textures and relief appearances. They were two types of oil paintings, four types of tiles, five types of wallpaper, and four types of curtains. FIG. 5 is a table illustrating the relationship between the spatial-frequency ranges to which the enhancement processing is applied and the respective visual evaluation results. The inventor performed image capture of each of the 15 objects under the respective conditions noted in FIG. 5 as No. 1 to No. 7, which indicate the respective spatial-frequency ranges on which the enhancement unit 42 performed the enhancement processing, and obtained the respective pieces of image data (respective captured images). No method being established to evaluate the texture and the relief appearance (three-dimensional appearance) of the captured image, the inventor performed visual evaluation by comparing the obtained captured image displayed on a display with the corresponding actual object. The display used for this experiment is ColorEdge CG221, which is manufactured by Nanao Corporation. The inventor set the display size of the object on the display equal to the size of the actual object. That is, the inventor set the display so that the image size on the display=resolution×{the number of pixels in the x (or y) direction} is equal to the size of the actual object.

A criterion for the visual evaluation was whether the texture and the relief appearance (three-dimensional appearance) are improved as a result of the comparison of the image when the enhancement processing is performed and the image when no enhancement processing is performed. In condition No. 1, colors of the image was changed by the enhancement processing because a spatial frequency of 0.0 (cycle/mm) was included in the spatial-frequency range on which the enhancement processing was performed. Such a change in color is inappropriate for improvement of the texture and the relief appearance (three-dimensional appearance). As a result, an enhanced image is formed that is not acceptable to a viewer. This is because the enhancement processing that enhances the frequency component of the spatial frequency k=0.0 is equivalent to an increase in average value of all of the pixels of the image, resulting in the color (hue) of the image being changed.

Conditions No. 3 and No. 4 correspond to a case where the spatial-frequency ranges on which the enhancement processing is performed are changed from that in the embodiment. The results show that, when the spatial-frequency range equal to or larger than the spatial frequency k=1.0 (cycle/mm) is enhanced, improvements of the relatively small relief appearances on the surfaces of the objects were perceived, but the processed images were perceived such that the shading is simply enhanced, which does not result in the texture and relief appearance (three-dimensional appearance) being improved.

In condition No. 2, the enhancement unit 42 performed the enhancement processing on the spatial-frequency range of 0.0<k<1.0. Under this condition, the captured images were obtained in which the texture and the relief appearance (three-dimensional appearance) were improved.

Condition No. 5 corresponds to a case where the enhancement processing is performed on the range including those of conditions No. 2 and No. 3. The result shows that the improvement of the texture and the relief appearance (three-dimensional appearance) was perceived, but the enhancement of moderately fine shading was noticeable due to the enhancement performed on a high frequency side, resulting in the enhancement impairing the improvement of the texture and the relief appearance (three-dimensional appearance). The result of condition No. 5 was not superior to that of condition No. 2 as a whole, but rather inferior to that of condition No. 2.

Conditions No. 6 and No. 7 correspond to a case where the range to be enhanced of condition No. 2 is divided into two. Both of the results show that the captured images were obtained in which the texture and the relief appearance (three-dimensional appearance) were improved.

As described above, the captured image can be obtained in which the texture and the relief appearance (three-dimensional appearance) are improved by performing the enhancement processing on the spatial-frequency spectra in a range of 0.0<k<1.0, where k is the spatial frequency expressed in one-dimensional form.

Second Experiment Example

The inventor carried out the experiment in which the image capture apparatus 1 was operated by changing the value of the enhancement coefficient $\alpha_k$. The objects used were the 15 types of objects, which were the same as those in the first experiment example, namely, two types of oil paintings, four types of tiles, five types of wallpaper, and four types of curtains. The inventor performed image capture of each of the 15 types of objects under the conditions in which the enhancement coefficient $\alpha_k$ was set from 0.5 to 2.5, and obtained the respective captured images. No method being established to evaluate the texture and the relief appearance (three-dimensional appearance) of the captured image, the inventor performed visual evaluation by comparing the thus obtained captured image displayed on a display with the actual object. The visual evaluation was based on the following two criteria.

Criterion 1

Criterion 1 is whether the texture and relief appearance (three-dimensional appearance) are improved in the comparison of the captured image displayed on the display with the actual object, using the captured image when the enhancement coefficient $\alpha_k$=1.0 (image when the enhancement unit 42 does not perform the enhancement processing) as a reference.

Criterion 2

Criterion 2 is whether a sense of incongruity is evoked in the comparison of the captured image displayed on the display with the actual object. The sense of incongruity means that a viewer can perceive the enhancement in the image or perceive the improvement of the relief appearance that is not felt as natural.

FIG. 6 is a table illustrating the visual evaluation results when the enhancement coefficient $\alpha_k$ was changed. As illustrated in FIG. 6, when the enhancement coefficient $\alpha_k$ was set equal to or smaller than 1.0, no improvement was achieved in view of whether the texture and the relief appearance (three-dimensional appearance) were improved in the comparison of the captured image with the captured image when no enhancement processing was performed ($\alpha_k=1$) (in view of criterion 1). When the enhancement coefficient $\alpha_k$ was set equal to or smaller than 1.0, the texture and the relief appearance (three-dimensional appearance) were decreased and the image becomes closer to a plain image as the value of the enhancement coefficient $\alpha_k$ was decreased.

When the enhancement coefficient $\alpha_k$ was set equal to or larger than 1.0, the texture and the relief appearance (three-dimensional appearance) were improved in view of criterion 1. When the enhancement coefficient $\alpha_k$ was set equal to or larger than 1.0, the texture and the relief appearance (three-dimensional appearance) were increased as the value of the enhancement coefficient $\alpha_k$ was increased.

In view of whether a sense of incongruity was evoked from the enhanced image (in view of criterion 2), no sense of incongruity was evoked from the captured images when the enhancement coefficient $\alpha_k$ was set smaller than 2.0. When the enhancement coefficient $\alpha_k$ was set equal to or larger than 2.0, it results in that the enhancement was perceived, a sense of incongruity was evoked from the captured images and the natural relief appearance was not achieved.

From the results of the second experiment example, it can be understood that both of the improvement of the texture and the relief appearance (three-dimensional appearance) and the prevention of adverse effects such as a sense of incongruity can be achieved by setting the enhancement coefficient $\alpha_k$ to be larger than 1.0 and smaller than 2.0.

As described above, the conventional technique has a problem in that it is difficult to obtain the captured image in which the texture and the relief appearance of the object are sufficiently reflected. This means that a user of the captured image can recognize a difference between the object and the captured image when viewing the object directly and the capture image. That is, such a captured image does not provide realistic sensation or visual reality. As a result, when the captured image is used for a product advertisement, the advertisement has a low appeal.

The inventor had been seeking a way to improve the texture of the captured image, and found that the captured image in which the surface relief of the object is realistically reproduced and the texture and the relief appearance are enhanced can be obtained by causing the light irradiation unit 2 to produce shadow caused by surface relief of the object and by enhancing a specific frequency component of the result of reading reflected light from the object. The image capture apparatus 1 in the embodiment can obtain the captured image providing the realistic sensation and the visual reality of the object, which are not sufficiently provided by the conventional technique. As a result, when the captured image obtained by the image capture apparatus 1 is used for a product advertisement, the advertisement has a high product appeal and can attract a lot of attention from customers. It is needless to say that the captured image providing the realistic sensation and the visual reality of the object can be applied to various applications besides product advertisement.

The reason why the image capture apparatus 1 can obtain the captured image in which the texture and the relief appearance of the object are reproduced at a higher level than that of the conventional manner is not entirely clear. The inventor thinks as follows. In the image capture apparatus 1, shadow caused by the surface relief of the object is produced by the light irradiation unit 2 and thereafter reflected light from the object is read. The lighting condition by which such shadow is produced is indispensable because the surface relief of the object is reflected in the captured image through the shadow (The captured image in which the surface relief of the object is reflected cannot be obtained when no shadow is produced).

In addition, in the image capture apparatus 1, the enhancement processing is performed on the specific frequency component of the image data, which is the result of reading. The inventor found that this operation (processing) improves realistic sensation and visual reality. The inventor thinks that the following is the reason thereof. It is ideal for the reading unit 3 of the image capture apparatus 1 that reflected light from an attention area of the object completely corresponds to data value of the attention area (attention pixel) of the captured image data. However, this corresponding relation is not always completely satisfied practically (the imaging performance of the reading optical system at such a level that no failures in the shape and colors of the object occur, in the captured image is assured).

Practically, part of reflected light from an area other than the attention area of the object influences the data value of the attention pixel of the captured image (in the light receiving unit such as the CCD in the reading optical system, reflected light from another area (unwanted light) gets mixed with reflected light from the attention area). A phenomenon called a flare in an optical system resembles this phenomenon. The flare is a phenomenon that is perceived as a defect on an image. The previously mentioned phenomenon relating to the image capture apparatus 1 has an intensity of such a very small level that it is not obviously perceived, and influences the considerably distant pixels. In this point, the previously mentioned phenomenon differs from the flare. Even though the previously mentioned phenomenon is not obviously perceived, the previously mentioned phenomenon influences the texture and the relief appearance of the object and causes the deterioration of the texture and the relief appearance in the captured image.

It is believed that the enhancement processing performed on the specific spatial-frequency component of the image data, which is the result of reading, corresponds to conversion (corresponding to, so to speak, inverse conversion) that corrects the above-described phenomenon in which part of reflected light from the area other than the attention area of the object influences the value of the attention pixel. It is believed that the enhancement processing performed on the specific spatial-frequency component has an effect similar to that of the reduction of the phenomenon in which part of reflected light from the area other than the attention area of the object gets mixed, and as a result, the capture image can be achieved in which the texture and the relief appearance of the object are improved.

In the image capture apparatus 1, the captured image in which the texture and the relief appearance of the object are further improved than those of the conventional technique can be obtained by the configuration in which the image capture apparatus 1 includes the light irradiation unit 2 that produces shadow caused by the surface relief of the object by irradiating the object with light, the reading unit 3 that reads reflected light from the object, and the enhancement unit 42 that performs the enhancement processing on a specific frequency component of the scanning result.

As a result of the study done by the inventor on the texture and the relief appearance (three-dimensional appearance), it has been found that the enhancement processing performed in the specific spatial-frequency range as described above has a large effect of improving the texture and the relief appearance (three-dimensional appearance) of the object. That is, the image capture apparatus 1 can obtain the captured image in which the texture and the relief appearance (three-dimensional appearance) of the object are achieved at a higher level than those of the conventional technique.

When the enhancement processing is performed on the spatial frequency k=0.0, which is lower than the spatial-frequency range described above, no particular effect is obtained in the texture and the relief appearance (three-dimensional appearance) of the object whereas colors of the images are changed. This is because the enhancement processing that enhances the frequency component of the spatial frequency k=0.0 is equivalent to an increase in average value of all of the pixels of the image, resulting in colors of the image being changed.

When the enhancement processing is performed on the spatial frequency k>1.0, which is larger than the spatial-frequency range described above, the captured image after the enhancement is perceived as the image in which shading is simply enhanced while relatively small relief appearance on the surface of the object is improved. The enhancement processing is not effective for the improvement of the texture and the relief appearance (three-dimensional appearance), which is the focus of the inventor. That is, the enhancement processing performed on the limited spatial-frequency range described above enables the captured image in which the texture and the relief appearance (three-dimensional appearance) of the object are effectively improved, to be obtained without a side effect of a change in color of the image or being viewed as an image in which a shading is simply enhanced.

As a result of the study on the invention, it has been found that the texture and the relief appearance (three-dimensional appearance) of the object is not improved but deteriorates when the enhancement processing is performed using the enhancement coefficient $\alpha_k \leq 1.0$, which is lower than the enhancement coefficient range described above. This is because the processing using the enhancement coefficient ($\alpha_k \leq 1.0$) is equivalent to the processing to suppress the frequency component. As a result, the processing causes the texture and the relief appearance (three-dimensional appearance) of the object to deteriorate, which corresponds to the opposite effect from what the invention aims for, i.e., the improvement of the texture and the relief appearance (three-dimensional appearance) of the object.

It has been found that the texture and the relief appearance of the object are improved but a viewer can perceive that the image is enhanced when the enhancement processing is performed using the enhancement coefficient ($\alpha_k \geq 2.0$), which is larger than the enhancement coefficient range described above (the relief appearance of the object is enhanced; the enhancement, however, is perceived by a viewer not as natural but as unnatural). This processing is not effective for the improvement of the texture and the relief appearance (three-dimensional appearance) of the object, which is the focus of the inventor, in view of achieving the enhancement in a natural manner.

By limiting the enhancement coefficient $\alpha_k$ in the range described above, the captured image can be obtained in which the texture and the relief appearance (three-dimensional appearance) of the object are effectively improved without adversely effects such as the deterioration of the texture and the relief appearance (three-dimensional appearance) of the object contrary to the aim, and an unnatural relief appearance perceivable by a viewer.

As described above, the image capture apparatus 1 can obtain the captured image in which the texture and the relief appearance of the object are further improved than those of the conventional technique without adversely effects such as the deterioration of the visual texture and the surface relief appearance (three-dimensional appearance) of the object contrary to the aim, and an unnatural relief appearance perceivable by a viewer.

First Modification

In a first modification of the image capture apparatus 1, the enhancement unit 42 does not multiply the spatial-frequency spectrum by the enhancement coefficient $\alpha_k$ uniformly (as expressions (3) and (4)) in the spatial-frequency range on which the enhancement processing is performed, but multiplies the spatial-frequency spectrum by the enhancement coefficient $\alpha_k$ of a small value in a domain nearer the upper limit than an intermediate frequency domain (an upper side frequency domain) and in a domain nearer the lower limit than the intermediate frequency domain (a lower side frequency domain) in the spatial-frequency domain in which the enhancement processing is performed. The intermediate frequency domain indicates a spatial-frequency domain between the upper spatial frequency and the lower limit spatial frequency in the spatial-frequency range on which the enhancement processing is performed. For example, the intermediate frequency domain is a domain roughly in the vicinity of the intermediate value of the upper spatial frequency and the lower spatial frequency. In the first modification, the enhancement unit 42 calculates the spatial-frequency spectrum after the enhancement is performed using the following expression (6) instead of using expression (3).

$$F'(u, v) = \left\{1.0 + 0.3 \times \sin\left(\pi \frac{k - k_{min}}{k_{max} - k_{min}}\right)\right\} \times F(u, v) \quad \text{(for } k > 0.0 \text{ and } k < 1.0) \quad (6)$$
$$= F(u, v) \quad \text{(for } k = 0.0 \text{ or } k \geq 1.0)$$

The spatial frequency k is defined in the same manner as expression (2) and $k_{max}$ and $k_{min}$ are expressed by the following expression (7). That is, in the first modification, the enhancement coefficient $\alpha_k$ is expressed by the following expression (8).

$$k_{max} = 1.0 \quad (7)$$
$$k_{min} = 0.0$$

$$\alpha_k = 1.0 + 0.3 \times \sin\left(\pi \frac{k - k_{min}}{k_{max} - k_{min}}\right) \quad \text{(for } k > 0.0 \text{ and } k < 1.0) \quad (8)$$
$$= 1.0 \quad \text{(for } k = 0.0 \text{ or } k \geq 1.0)$$

Figure 7:
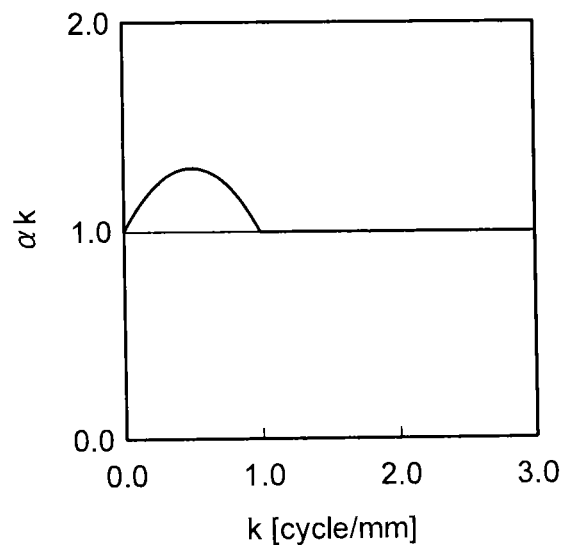
FIG. 7 is a graph illustrating a relation between a spatial frequency k and the enhancement coefficient $\alpha_k$ in a first modification.

FIG. 7 is a graph illustrating a relation between the spatial frequency k and the enhancement coefficient $\alpha_k$ in the first modification. As illustrated in FIG. 7, in the first modification, the enhancement coefficient $\alpha_k$ is set in such a manner that the value of the enhancement coefficient $\alpha_k$ is smaller in the frequency domain in the vicinity of the lower limit (in the vicinity of k=0.0) and in the frequency domain in the vicinity of the upper limit (in the vicinity of k=1.0) than the intermediate frequency domain (in the vicinity of k=0.5) in the spatial-frequency domain (k>0.0 and k<1.0) in which the enhancement processing is performed. The intermediate frequency domain is not limited to being set in the vicinity of k=0.5. The enhancement processing performed by the enhancement unit 42 is not limited to being done using expression (6).

Various rules may be used for a method of enhancing the spatial-frequency component. As a result of the study done by the inventor, the improvement of the texture and the relief appearance (three-dimensional appearance) of the object can be achieved in the image on which the enhancement processing is performed without evoking a sense of incongruity by performing the enhancement processing in such a manner that the level of the enhancement is lower in the vicinities of the upper and the lower limits than that in the vicinity of the middle in the spatial-frequency range on which the enhancement processing is performed.

As a result of the study performed by the inventor on the texture and the relief appearance (three-dimensional appearance) of the object, it has been found that the improvement of the texture and the relief appearance (three-dimensional appearance) are achieved but a viewer can perceive that the resulting image is enhanced causing a sense of incongruity in the image after the enhancement when the enhancement processing is performed in the vicinities of the upper and lower limits at a higher level than that in the vicinity of the middle in the spatial-frequency range on which the enhancement processing is performed unlike the processing in the first modification. This sense of incongruity is caused by the occurrence of an aspect in which a viewer can perceive the image as an enhanced image because an increase in shading of the image caused by the enhancement processing influences factors of image quality other than the improvement of the texture and the relief appearance (three-dimensional appearance).

The configuration in the first modification can improve the texture and the relief appearance (three-dimensional appearance) of the object in a more natural manner, while preventing that the enhancement can be perceived or a sense of incongruity is evoked from the image.

Second Modification

In a second modification of the image capture apparatus 1, the enhancement unit 42 does not multiply the spatial-frequency spectrum by the enhancement coefficient $\alpha_k$ uniformly (as expressions (3) and (4)) in the spatial-frequency range on which the enhancement processing is performed, but performs the multiplication by changing the value of the enhancement coefficient $\alpha_k$ in accordance with a direction of the spatial frequency in the spatial-frequency domain in which the enhancement processing is performed. That is, the enhancement unit 42 performs the enhancement processing at different levels in accordance with the direction on the image. In the second modification, the enhancement unit 42 calculates the spatial-frequency spectrum after the enhancement using the following expression (9) instead of using expression (3).

$$F'(u, v) = \{1.2 - 0.2 \times \cos(2\theta - \delta)\} \times F(u, v) \quad \text{(for } k > 0.0 \text{ and } k < 1.0) \quad (9)$$
$$= F(u, v) \quad \text{(for } k = 0.0 \text{ or } k \geq 1.0)$$

In this expression, $\theta$ is calculated by the following expression (10) using $k_x$ and $k_y$ expressed by expression (2). The unit of $\theta$ is radian (rad).

$$\theta = \arctan(k_y/k_x) \quad (10)$$

As expressed by expression (10), $\theta$ represents the direction indicated by the vector of two-dimensional spatial frequency $(k_x, k_y)$. In the second modification, the value of $\delta$, which represents a phase angle, is set to 0.0 (rad) as expressed by the following expression (11).

$$\delta = 0.0 [\text{rad}] \quad (11)$$

That is, in the second modification, the enhancement coefficient $\alpha_k$ is expressed by the following expression (12).

$$\alpha_k = 1.2 - 0.2 \times \cos 2\theta \quad \text{(for } k > 0.0 \text{ and } k < 1.0) \quad (12)$$
$$= 1.0 \quad \text{(for } k = 0.0 \text{ or } k \geq 1.0)$$

Figure 8:
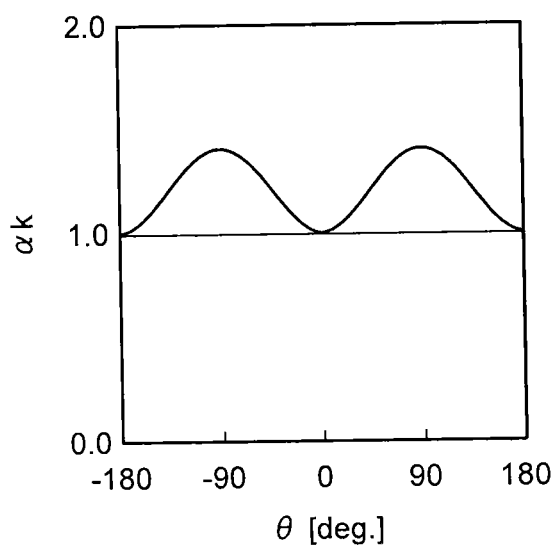
FIG. 8 is a graph illustrating a value of $\alpha_k$ in an enhancement domain.

FIG. 8 is a graph illustrating the value of $\alpha_k$ in the domain (k>0.0 and k<1.0) in which the enhancement processing is performed. In FIG. 8, the unit in the abscissa axis is degree (deg). As illustrated in FIG. 8, in the second modification, the enhancement unit 42 performs the enhancement processing at a high level in directions of +90 degrees and −90 degrees and performs the enhancement processing at a low level in directions of 0 degrees and 180 degrees.

In this way, the enhancement unit 42 performs the enhancement processing at a high level in directions of +90 degrees and −90 degrees. This is because the irradiation direction of the light irradiation unit 2 in the second modification coincides with a direction connecting +90 degrees and −90 degrees. That is, in the second modification, the texture and relief appearance (three-dimensional appearance) can be effectively enhanced by enhancing the spatial-frequency component in a direction along which shadow caused by the relief of the object is produced. If the frequency spectra are enhanced in all directions, the shading not caused by the relief or the shape of the object is also enhanced, thereby serving as a factor producing a sense of incongruity due to the enhancement. In the second modification, the enhancement of the shading (e.g., a change in color) not relating to the texture and the relief appearance (three-dimensional appearance) of the object is prevented and the texture and the relief appearance (three-dimensional appearance) can be effectively enhanced.

In the second modification, shadow can be enhanced and the texture and the relief appearance (three-dimensional appearance) can be effectively enhanced by performing the enhancement processing on the image data obtained under a typical lighting condition (irradiation condition) by setting the value of $\delta$ expressed by expression (11) to correspond to the direction perpendicular to the irradiation direction of light. Even if the irradiation direction of light cannot be identified, the irradiation direction of light can be estimated by performing a spatial-frequency analysis on the image data so as to identify a direction in which a large power spectrum is included. The texture and the relief appearance (three-dimensional appearance) of the object can be effectively enhanced by setting the value of $\delta$ expressed by expression (11) to correspond to the direction perpendicular to the estimated irradiation direction.

According to the study done by the inventor, by setting the enhancement coefficient to different values in accordance with the direction of the spatial frequency, the shading not caused by the relief and the shape of the object can be prevented from being enhanced and the areas that produce senses of incongruity can be reduced. As an example of the shading not caused by the relief and the shape of the object is a change in color of the object (e.g., a boundary between colors). In such areas, relief does not always exist. As a result, the areas produce a sense of incongruity after being enhanced.

The texture and the relief appearance (three-dimensional appearance) of the object can be perceived as a result of that shadow is produced on the surface of the object by the relief and the shape of the object. Such shadow is produced so as to have directionality in the image (if the object is irradiated with light from various directions, shadow has no directionality but such a lighting condition produces no shadow). It is believed that the enhancement of the shadow relates to the improvement of the texture and the relief appearance (three-dimensional appearance) of the object. Therefore, the enhancement of the frequency component in the direction in which the shadow is produced enables the image in which the texture and the relief appearance (three-dimensional appearance) of the object are improved, to be obtained. In this time, it is believed that the shading not caused by the relief and the shape of the object have no directionality. The enhancement of the shading (e.g., change in color) not relating to the texture and the relief appearance (three-dimensional appearance) of the object can be prevented and areas producing a sense of incongruity due to the enhancement can be reduced by performing the enhancement of the spatial frequency component in accordance with the directionality of the spatial frequency.

As described above, the areas producing a sense of incongruity due to the enhancement can be reduced by preventing the enhancement of the shading not relating to the texture and the relief appearance (three-dimensional appearance) of the object. As a result, the captured image can be obtained in which the texture and the relief appearance of the product are further improved than those of the conventional technique.

Third Modification

Figure 9:
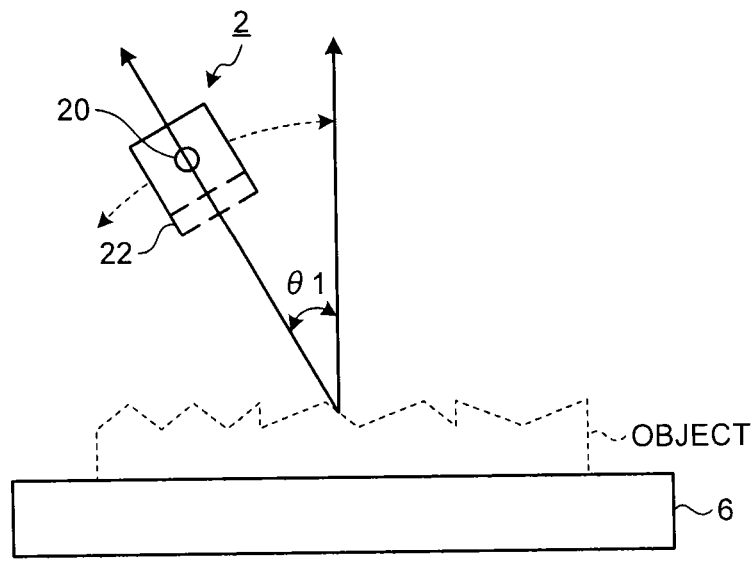
FIG. 9 is a sectional view illustrating a cross-section in the short direction of the light irradiation unit in a third modification.

In a third modification of the image capture apparatus 1, the light irradiation unit 2 is configured such that the position thereof is changeable. FIG. 9 is a sectional view illustrating a cross-section in the short direction of the light irradiation unit 2 in the third modification. As illustrated in FIG. 9, the light irradiation unit 2 in the third modification is supported in such a manner that the light irradiation unit 2 can be displaced as illustrated by the arrow with a dotted line (arc) so as to change the irradiation angle of light to the object. For example, the light irradiation unit 2 is displaced by a driving device (not illustrated) such that the tilt (an irradiation angle θ1) with respect to the direction perpendicular to the object (e.g., the vertical direction) is changed in a range from 0 to 70 degrees. The irradiation angle of the light irradiation unit 2 can be selected and set by a user. In the third modification, this configuration enables the shadow corresponding to the relief of the object, to be produced. As a result, the captured image can be obtained in which the texture and the relief appearance (three-dimensional appearance) of the object are well expressed.

As described above, it is believed that a viewer can perceive the surface relief appearance of the object through the shadow caused by the relief and the shape of the object. For producing the two-dimensional image data such as the captured image, reflected light under the image capture condition when the image capture is performed is the only information relating to the surface relief of the object (only a single lighting condition is reflected in the image data). If the shadow caused by the relief of the object is not appropriately reflected in the image data, the surface relief of the object is not reproduced in the two-dimensional image data. It is not easy to obtain the two-dimensional image data in which the surface relief of the object is reflected. Therefore, a problem often arises in that the information indicating the surface relief is lost in the two-dimensional image data. For this reason, it is necessary to acquire the two-dimensional data while producing the shadow caused by the relief of the object using an appropriate lighting position when the image capture of the object is performed.

The lighting condition appropriate for the relief of the object can be set by using the light irradiation unit 2, position of which can be changed, in the third modification. As a result, the shadow can be produced in which the relief and the shape of the object are reflected. Consequently, the captured image can be obtained in which the texture and the relief appearance (three-dimensional appearance) of the object are reproduced. The additional effect that the state of produced shadow of the object can be improved can be also obtained and the captured image can be obtained in which the texture and the relief appearance of the object are further improved than those of the conventional technique.

Fourth Modification

Figure 10:
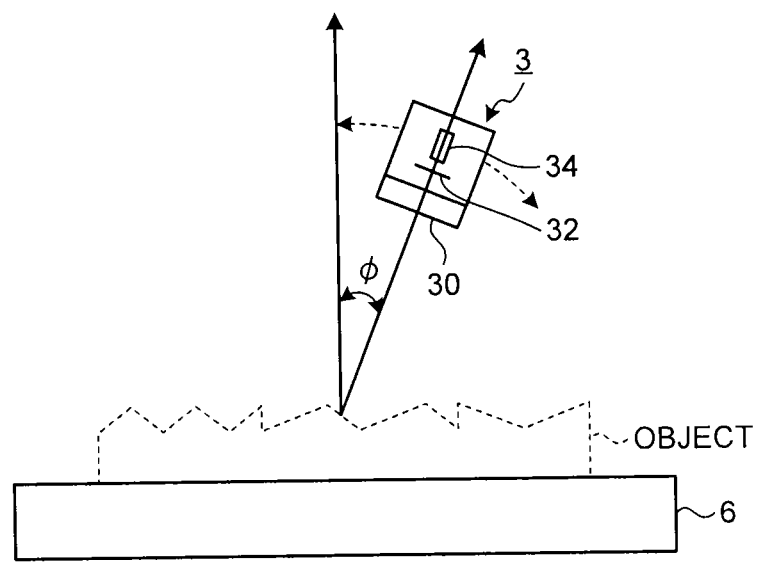
FIG. 10 is a sectional view illustrating a cross-section in the short direction of the reading unit in a fourth modification.

In a fourth modification of the image capture apparatus 1, the reading unit 3 is configured such that the position thereof is changeable. FIG. 10 is a sectional view illustrating a cross-section in the short direction of the reading unit 3 in the fourth modification. As illustrated in FIG. 10, the reading unit 3 in the fourth modification is supported in such a manner that the reading unit 3 can be displaced as illustrated by the arrow with a dotted line (arc) so as to change the light receiving angle to reflected light from the object. For example, the reading unit 3 is displaced by a driving device (not illustrated) such that the tilt (a light receiving angle φ) with respect to the direction perpendicular to the object (e.g., the vertical direction) is changed in a range from 0 to 70 degrees. The light receiving angle of the reading unit 3 can be selected and set by a user. In the fourth modification, the reading unit 3 can read the image in accordance with reflected light from the object on which the shadow is produced corresponding to the surface relief of the object. As a result, the captured image can be obtained in which the texture and the relief appearance (three-dimensional appearance) of the object are well expressed.

When the position of the light irradiation unit 2 is changeable as described in the third modification, the reading unit 3 in the fourth modification can avoid a case where the irradiation angle (θ1 in FIG. 9) and the light receiving angle (φ in FIG. 10) overlap with each other. That is, the setting can be made such that the reading unit 3 is not disposed at the position where regular reflection light of the irradiation light reaches. When regular reflection light is mixed in reflected light received by the reading unit 3, a sensitivity adjustment at the time of image capture of the object is difficult because regular reflection light has a huge light amount. This makes it difficult to obtain the image data in which the surface relief appearance of the object is reproduced. Accordingly, when the position of the light irradiation unit 2 is changeable, the position of the reading unit 3 is set after the position of the light irradiation unit 2 is determined. This makes it possible to prevent the reading unit 3 from being disposed at the position where regular reflection light of irradiation light reaches.

According to the study done by the inventor, it has become evident that the texture and the relief appearance (three-dimensional appearance) of the object are further improved by applying the image processing of the invention, which enhances the specific frequency component, on the captured image obtained by tilting the light receiving angle in the abovementioned manner. When the lighting position is changed in accordance with the surface relief of the object, the position where regular reflection light is reflected may also be changed due to the change of the lighting position. Regular reflection light, which is also called specular reflection light, is light reflected on a surface of a reflector (in this case, the object) at a reflection angle that is equal to an incident angle. If the light receiving device is disposed at the position where regular reflection light reaches, a problem arises in that it is difficult to set the light receiving sensitivity at the time of image capture of the object because regular reflection light has a large reflected light amount. This is because a receivable light amount of the light receiving device without the sensitivity adjustment corresponds to a very narrower range compared with that of a reflected light amount reflected from the actual reflector. This causes a problem in that it is difficult to obtain an appropriate captured image. More specifically, when the light receiving sensitivity is adjusted so as to correspond to regular reflection light, an area from which no regular reflection light is reflected becomes dark in the captured image. When the light receiving sensitivity is adjusted so as to correspond to the area from which no regular reflection light is reflected, an area from which regular reflection light is reflected becomes white in the captured image. In both cases, the captured image is not obtained in which the surface relief of the actual object is reproduced.

In view of such a problem, the reading unit 3 is also configured such that the position thereof is changeable in the fourth modification. This makes it possible to dispose the reading unit 3 in such a position that no regular reflection light of the irradiation light enters the reading unit 3 by disposing the reading unit 3 at an appropriate position when the lighting position is changed. As a result, the problem of the light receiving sensitivity caused by regular reflection light does not arise, and the light receiving sensitivity can be set without influence from regular reflection light. Consequently, the captured image can be obtained in which the texture and the relief appearance (three-dimensional appearance) of the object are improved.

In this way, the relief appearance of the object is further improved in the captured image by tilting the light receiving angle. In addition, reflected light from the object can be read without influence from regular reflection light.

The image capture apparatus 1 is not limited to a device such as a scanner. For example, the image capture apparatus 1 may capture an image in accordance with reflected light from the object without moving.

The embodiment can provide an advantage of obtaining the image data that sufficiently reproduces the texture and the relief appearance of the image capture target having relief.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capture apparatus, comprising:
a light irradiation unit that irradiates an object having relief appearances with light;
a reading unit that reads an image in accordance with reflected light of the light irradiated to the object; and
an enhancement unit that enhances a predetermined spatial-frequency component of the image,
wherein the enhancement unit performs enhancement processing in which a spatial-frequency spectrum in a spatial-frequency domain corresponding to a spatial frequency less than 1 cycle/mm is multiplied by a predetermined value, but spatial-frequency spectrum in other spatial-frequency domain remain unchanged.

2. The image capture apparatus according to claim 1, wherein the enhancement unit enhances the spatial-frequency component by a factor smaller than 2.

3. The image capture apparatus according to claim 1, wherein the enhancement unit enhances the spatial-frequency component in an upper limit side frequency domain and a lower limit side frequency domain at a lower level than a level of the enhancement in an intermediate frequency domain in a spatial-frequency range in which enhancement is performed.

4. The image capture apparatus according to claim 1, wherein the enhancement unit enhances the spatial-frequency component at different levels in accordance with an irradiation direction of the light on the image.

5. The image capture apparatus according to claim 1, wherein the light irradiation unit is capable of changing an angle of light irradiated to the object.

6. The image capture apparatus according to claim 1, wherein the reading unit is capable of changing an angle at which the reflected light from the object is received.

7. An image capture system, comprising:
an image acquisition unit that acquires an image read in accordance with reflected light of light irradiated to an object having relief appearances, from the object; and
an enhancement unit that enhances a predetermined spatial-frequency component of the image,
wherein the enhancement unit performs enhancement processing in which a spatial-frequency spectrum in a spatial-frequency domain corresponding to a spatial frequency less than 1 cycle/mm is multiplied by a predetermined value, but spatial-frequency spectrum in other spatial-frequency domain remain unchanged.

8. An image capture method, comprising:
irradiating an object having relief appearances with light;
reading an image in accordance with reflected light of the irradiated light from the object; and
enhancing, via a processor, a predetermined spatial-frequency component of the image,
wherein the enhancement unit performs enhancement processing in which a spatial-frequency spectrum in a spatial-frequency domain corresponding to a spatial frequency less than 1 cycle/mm is multiplied by a predetermined value, but spatial-frequency spectrum in other spatial-frequency domain remain unchanged.

* * * * *